(12) United States Patent
Fujisawa

(10) Patent No.: US 11,180,197 B2
(45) Date of Patent: Nov. 23, 2021

(54) VEHICLE BODY LOWER STRUCTURE

(71) Applicant: HONDA MOTOR CO., LTD., Tokyo (JP)

(72) Inventor: Kota Fujisawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 16/575,700

(22) Filed: Sep. 19, 2019

(65) Prior Publication Data

US 2020/0102020 A1 Apr. 2, 2020

(30) Foreign Application Priority Data

Sep. 27, 2018 (JP) .............................. JP2018-183017

(51) Int. Cl.
| | |
|---|---|
| *B62D 25/24* | (2006.01) |
| *B62D 25/20* | (2006.01) |
| *B62D 21/10* | (2006.01) |

(52) U.S. Cl.
CPC ............. *B62D 25/24* (2013.01); *B62D 21/10* (2013.01); *B62D 25/2027* (2013.01); *B62D 25/2072* (2013.01)

(58) Field of Classification Search
CPC .... B62D 25/24; B62D 21/10; B62D 25/2027; B62D 25/2072
See application file for complete search history.

(56) References Cited

U.S. PATENT DOCUMENTS

| | | | | |
|---|---|---|---|---|
| 5,803,533 A | * | 9/1998 | Schulz | B62D 21/00 296/204 |
| 2013/0026790 A1 | * | 1/2013 | Kakiuchi | B62D 35/02 296/193.07 |

(Continued)

FOREIGN PATENT DOCUMENTS

| | | |
|---|---|---|
| JP | H11-180233 A | 7/1999 |
| JP | 2008-030512 A | 2/2008 |

(Continued)

OTHER PUBLICATIONS

Office Action received in corresponding Japanese application No. 2018-183017 dated May 12, 2020 with English translation (10 pages).

(Continued)

*Primary Examiner* — Jason S Morrow
(74) *Attorney, Agent, or Firm* — Rankin, Hill & Clark LLP

(57) ABSTRACT

A vehicle body lower structure includes: an undercover having an opening and a first fixing portion disposed around the opening; a cover member having a second fixing portion and detachably attached to the undercover to close the opening; and a fixing member configured to detachably attach the second fixing portion to the first fixing portion, the fixing member being fixed to the first fixing portion and the second fixing portion from a lower side of the undercover. The undercover includes a general portion and the first fixing portion, and at least the general portion and the first fixing portion are made of a board member having a constant thickness. The second fixing portion of the cover member is thicker than the board member. The second fixing portion of the cover member is located over an upper surface of the undercover.

12 Claims, 10 Drawing Sheets

(56) References Cited

U.S. PATENT DOCUMENTS

2017/0174272 A1* 6/2017 Yonezawa ............ B62D 27/065
2020/0198708 A1* 6/2020 Endoh .................. B62D 27/065
2020/0369229 A1* 11/2020 Eguchi .................... B60R 19/48

FOREIGN PATENT DOCUMENTS

| JP | 2012-030681 A | 2/2012 | | |
|---|---|---|---|---|
| JP | 2014-237380 A | 12/2014 | | |
| JP | 2017-065412 A | 4/2017 | | |
| JP | 2017-074928 A | 4/2017 | | |
| JP | 2017074928 A | * 4/2017 | ............ | B62D 25/24 |
| JP | 2017-210177 A | 11/2017 | | |

OTHER PUBLICATIONS

Office Action received in corresponding CN application No. 201910923336.8 dated Aug. 31, 2021 with English translation (14 pages).

* cited by examiner

VEHICLE BODY LOWER STRUCTURE

CROSS-REFERENCE TO RELATED APPLICATION

This application claims the benefit of foreign priority to Japanese Patent Application No. JP2018-183017, filed Sep. 27, 2018, which is incorporated by reference in its entirety.

TECHNICAL FIELD

The present invention relates to a vehicle body lower structure comprising an undercover having an opening.

BACKGROUND ART

A vehicle body lower structure is disclosed, for example, in JP2012-30681A; the vehicle body lower structure includes an undercover having an opening, and a cover member detachably attached to the undercover to close the opening. The cover member is shaped like a tray having a generally recess-shaped vertical cross section, and detachably attached to the undercover from the lower side of the undercover. The cover member is fixed to the undercover by fastening bolts.

Snow or rainwater may flow into a space above the undercover. The vehicle body lower structure disclosed in JP2012-30681A is susceptible to snow or rainwater flowing into the space above the undercover, and disadvantageously the cover member for closing the opening may fall off due to the weight of the snow or rainwater.

With the above drawback of the conventional structure in view, the present invention seeks to provide a vehicle body lower structure which can prevent the cover member from falling off even if snow or rainwater flows into the space above the undercover.

SUMMARY

The present invention proposed to attain the above object provides a vehicle body lower structure comprising: an undercover having an opening and a first fixing portion disposed around the opening; a cover member having a second fixing portion and detachably attached to the undercover to close the opening; and a fixing member configured to detachably attach the second fixing portion to the first fixing portion, the fixing member being fixed to the first fixing portion and the second fixing portion from a lower side of the undercover, wherein the undercover includes a general portion and the first fixing portion, and at least the general portion and the first fixing portion are made of a board member having a constant thickness, wherein the second fixing portion of the cover member is thicker than the board member, and wherein the second fixing portion of the cover member is located over an upper surface of the undercover.

DETAILED DESCRIPTION OF THE INVENTION

Figure 1:
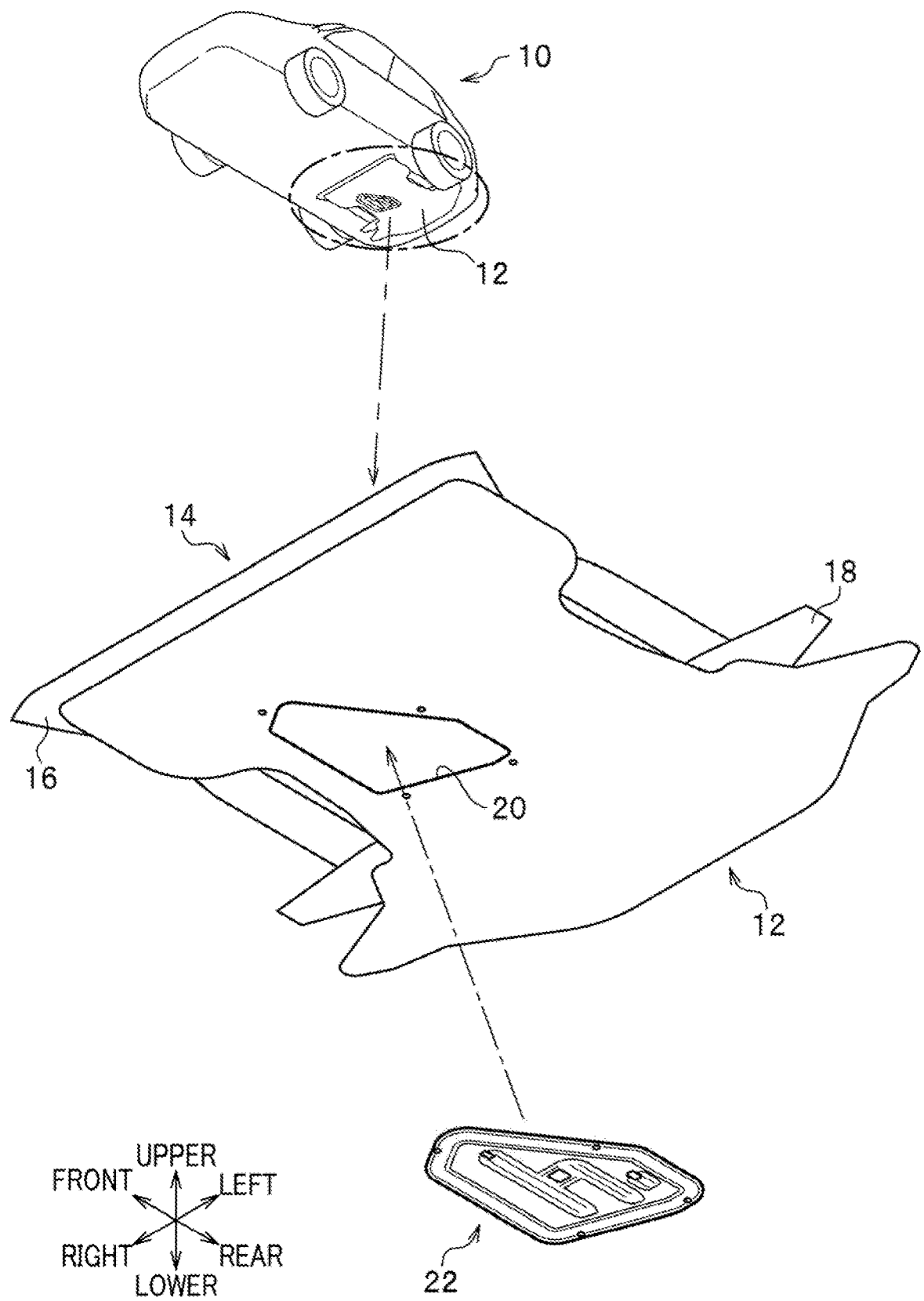
FIG. 1 is an exploded perspective view illustrating a rear side of a vehicle body as viewed from a bottom side of a vehicle, in which a vehicle body lower structure according to one embodiment of the present invention is adapted to the rear part of the vehicle body.

One embodiment of the present invention will be described in detail with reference to the drawings where necessary. In the drawings, front and rear directions refer to corresponding directions in the longitudinal direction (i.e., front-rear direction) of a vehicle, right and left directions refer to corresponding directions in the vehicle width direction (i.e., lateral direction or right-left direction) of the vehicle, and upper and lower directions refer to corresponding directions in the vertical direction (i.e., upper-lower direction) of the vehicle.

Figure 2:
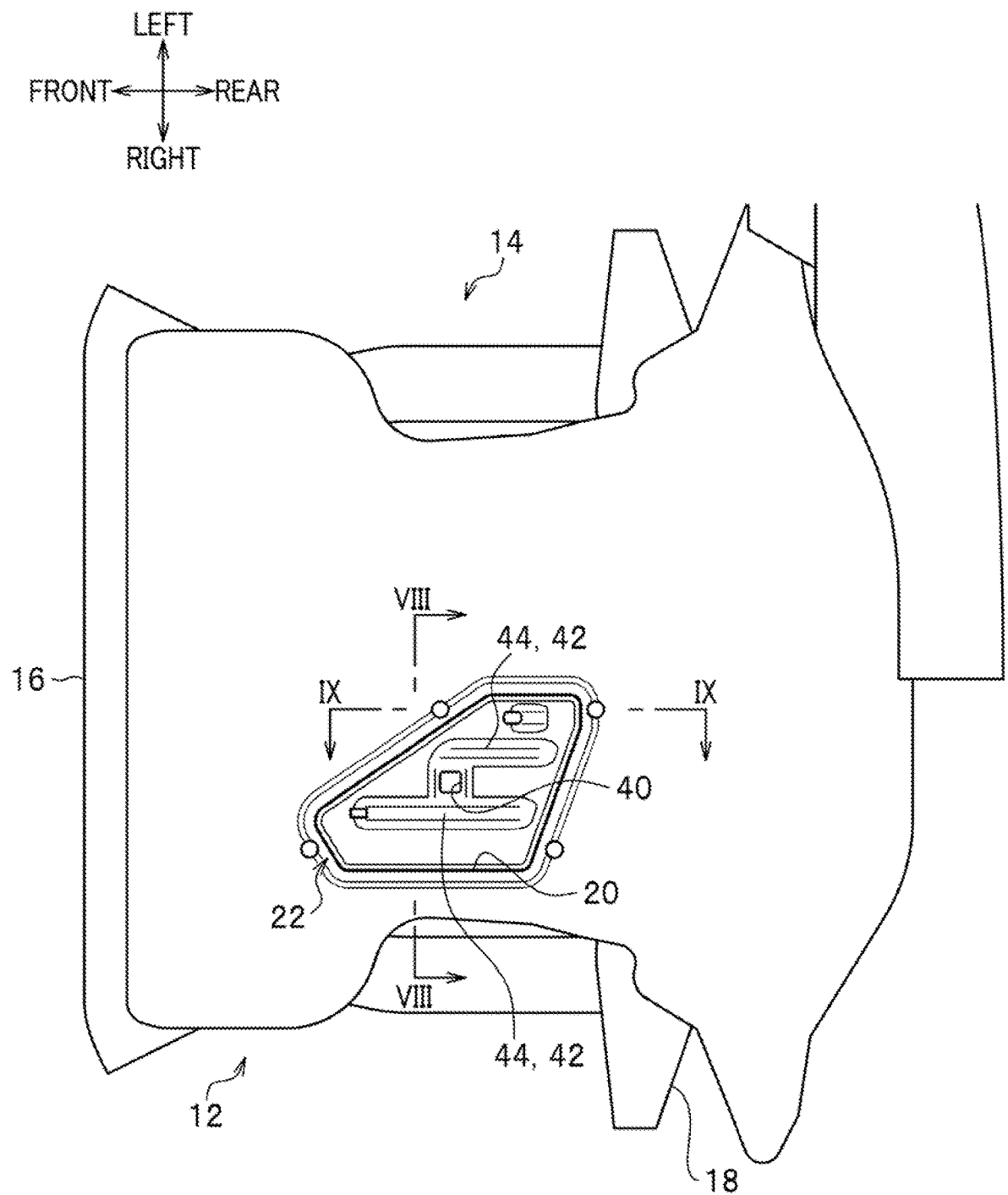
FIG. 2 is an enlarged bottom view of an undercover shown in FIG. 1 as viewed from the bottom side of the vehicle.
Figure 3:
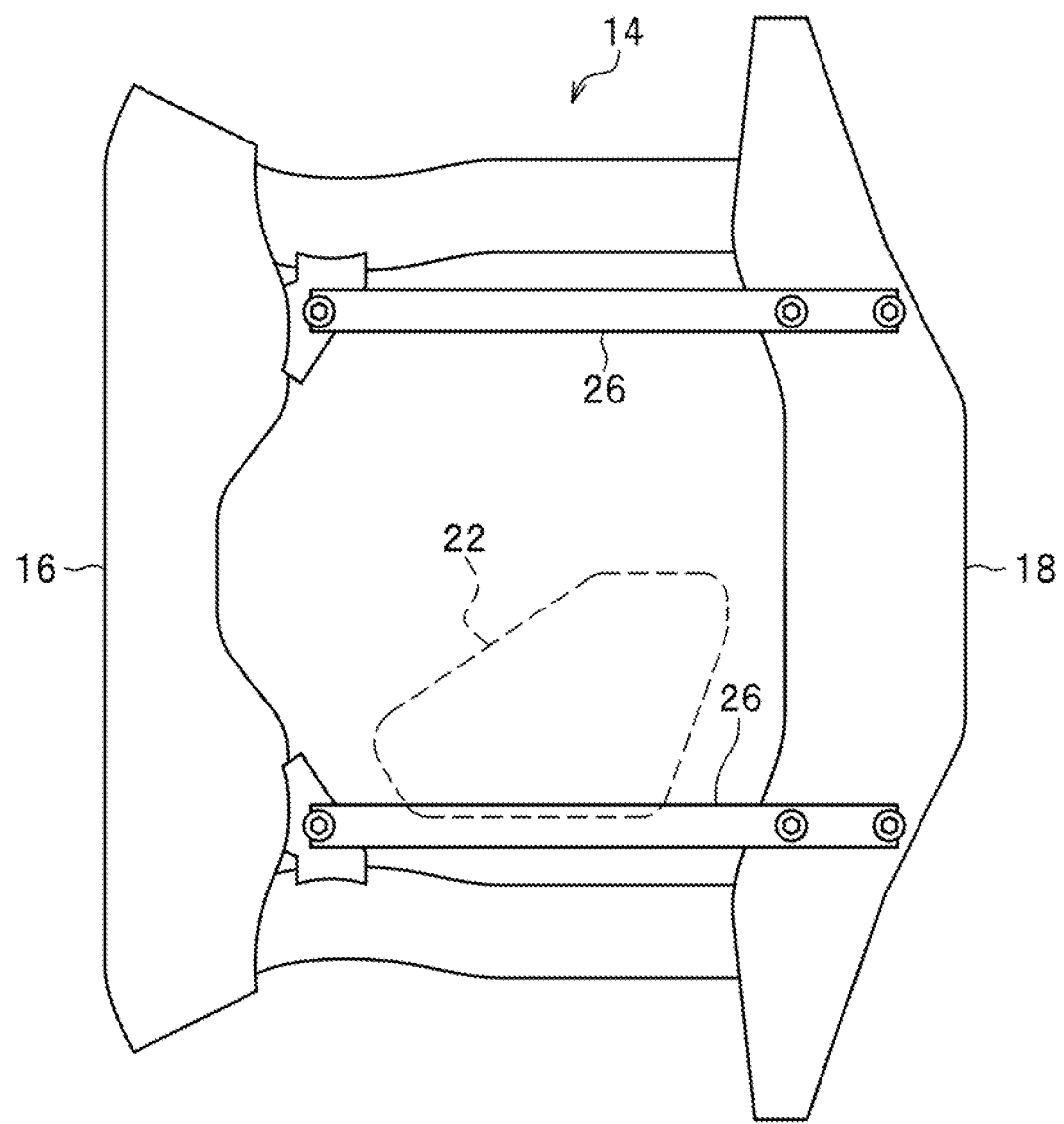
FIG. 3 is an enlarged bottom view of the rear part of the vehicle body, in which the undercover has been removed.

As seen in FIG. 1, a vehicle 10 includes an undercover 12 at a rear side of the vehicle 10; the undercover 12 is disposed at a lower side of a vehicle body. As seen in FIG. 2, the undercover 12 is generally rectangular in shape as viewed from below. As seen in FIG. 3, the undercover 12 is securely fixed to a front cross member 16 and a rear cross member 18 that constitute a rear sub-frame 14.

Figure 5:
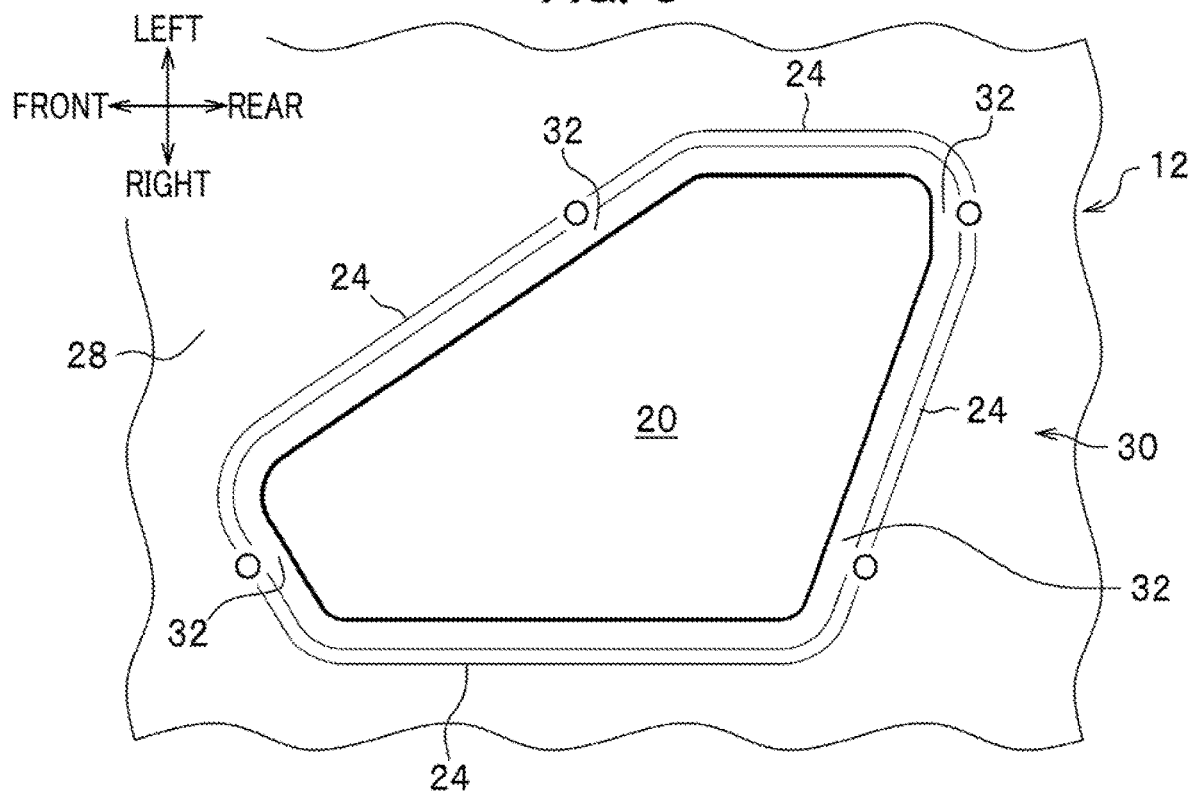
FIG. 5 is an enlarged bottom view similar to FIG. 4 but with the cover member removed.

As seen in FIG. 2, an opening 20 is formed in the undercover 12 at a longitudinally central and laterally offset position (i.e., in the longitudinal direction of the vehicle 10, the opening is formed in a central area of the undercover 12, and in the vehicle width direction, the opening is formed in an offset position). The opening 20 is closed by a cover member 22. The cover member 22 is detachably attached to the undercover 12 to close the opening 20. As seen in FIG. 5, a bead (second bead) 24 is provided on the undercover 12 at a position surrounding the opening 20. The bead 24 extends along the peripheral edge of the opening 20 to surround the opening 20. The bead 24 has a substantially circular cross section as taken along the line perpendicular to the longitudinal direction of the bead 24. The bead 24 protrudes downward (toward a road surface).

A pair of right and left braces 26, 26 as an example of sub-frame constituent members are arranged in the vehicle width direction beside the opening 20 (see FIG. 3). Each of the braces 26 extends in the longitudinal direction of the vehicle 10, and is bridged (connected) between a front cross member 16 and a rear cross member 18 that constitute a rear sub-frame 14.

As seen in FIG. 5, the undercover 12 includes an undercover body 30 having a general portion 28, and at least one first fixing portion 32 (a plurality of first fixing portions 32 in this embodiment) to which the cover member 22 is attached and fixed. The first fixing portions 32 are located at positions higher than the undercover body 30 through stepped portions 34 to be describe later (see FIG. 11). The first fixing portions 32 are disposed spaced apart from each other, along the periphery of the opening 20 of the undercover 12. The first fixing portions 32 of the undercover 12 and second fixing portions 36 (which will be described later) of the cover member 22 are fixed to each other by fixing members. To be describe later, a fixing member is configured to detachably attach the second fixing portion 36 to the first fixing portion 32; the fixing member is fixed to the first fixing portion 32 and the second fixing portion 36 from a lower side of the undercover 12.

The undercover 12 is integrally formed, for example, by stamping (press-working) a sheet of metallic material, such as sheet metal and metal plate. The undercover body 30 having the first fixing portions 32 and the general portion 28 are made of a board member having a constant thickness. The board member may be a sheet metal or a metal plate.

Figure 6A:
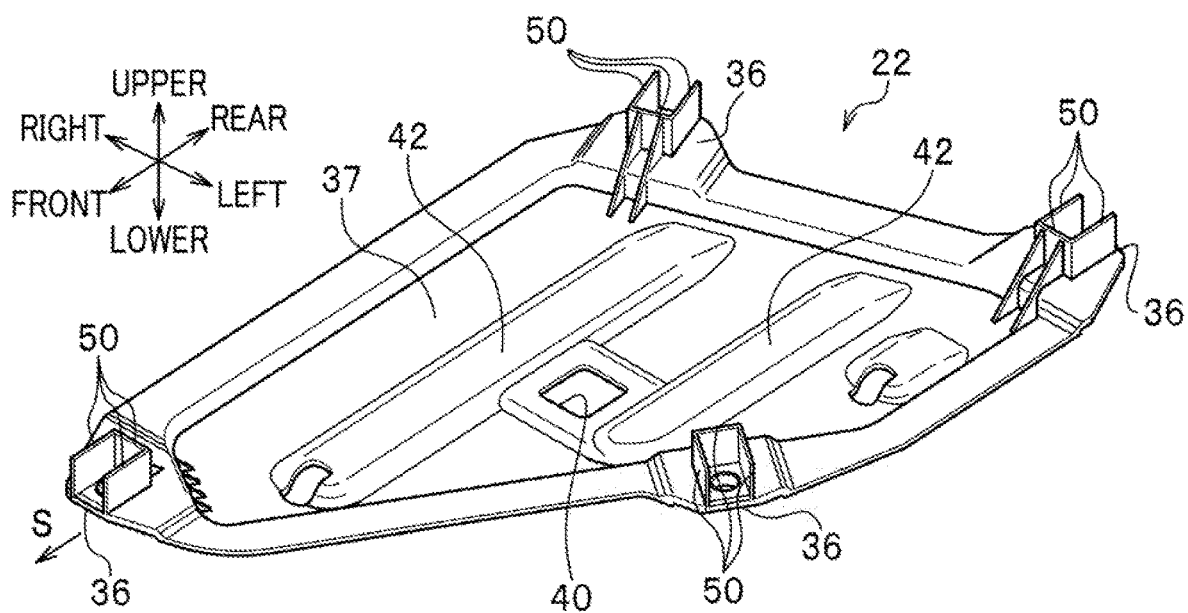
FIG. 6A is an enlarged perspective view of the cover member as viewed from an upper side of the cover member.
Figure 6B:
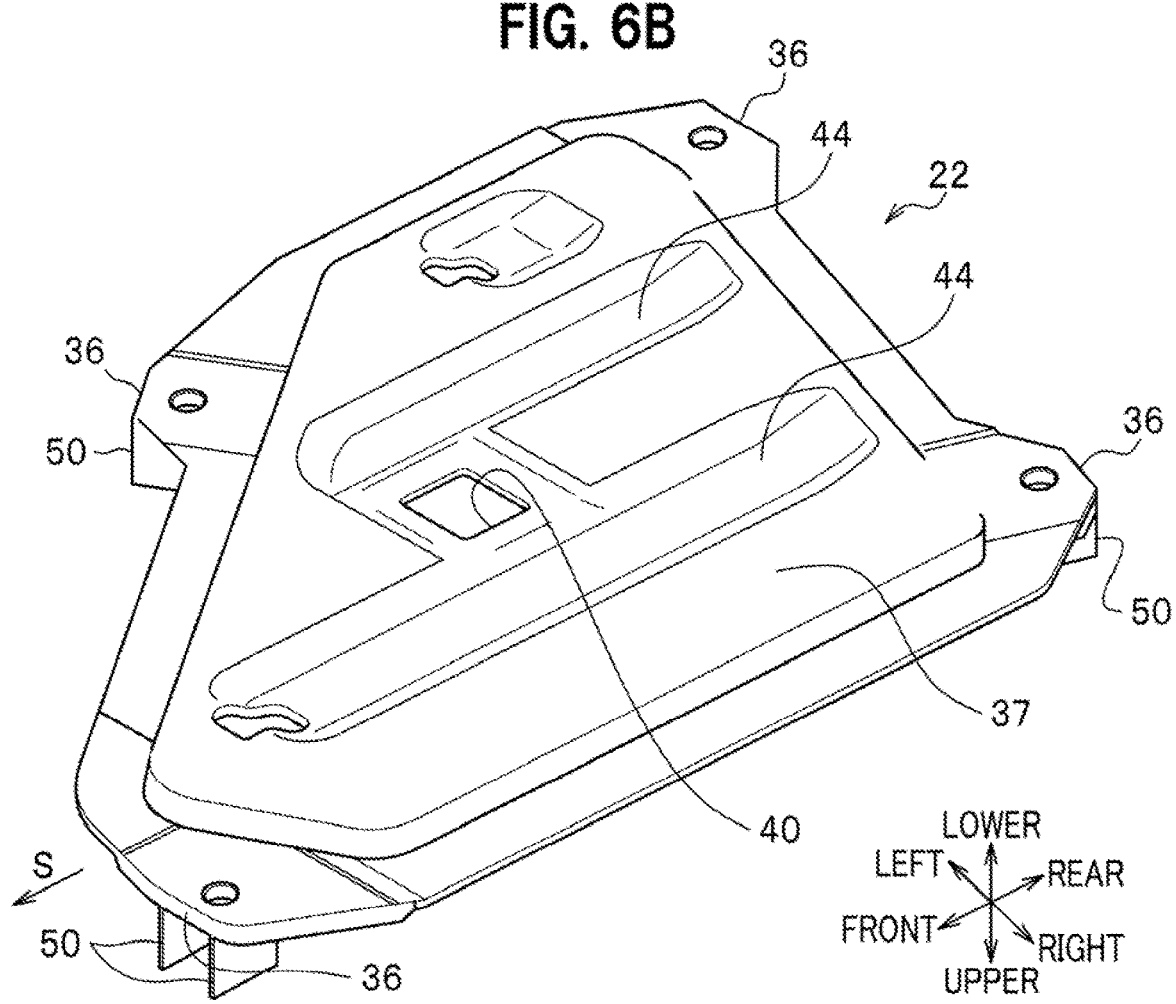
FIG. 6B is an enlarged perspective view of the cover member as viewed from a lower side of the cover member.
Figure 9:
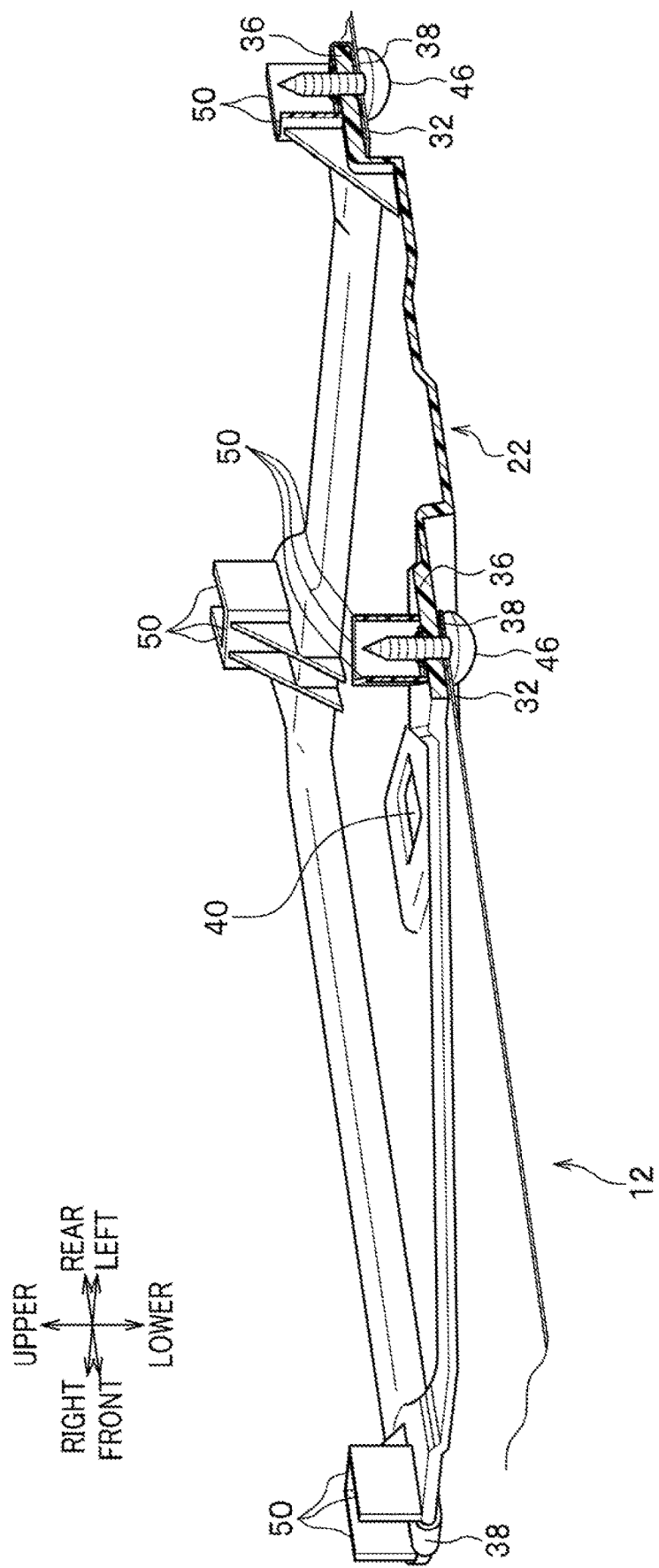
FIG. 9 is a perspective sectional view taken on the line IX-IX of FIG. 2.

As seen in FIGS. 6A and 6B, the cover member 22 includes a cover body 37, at least one second fixing portion 36 (a plurality of second fixing portions 36 in this embodiment). The cover member 22 is made, for example, by injection molding of plastic material. The second fixing portions 36 are disposed at positions corresponding to the first fixing portions 32 of the undercover 12; the second fixing portions 36 are provided to be fixed to the corresponding first fixing portions 32. The second fixing portions 36 of the cover member 22 are thicker than the board member from which the undercover 12 is formed (see FIG. 9).

Figure 11:
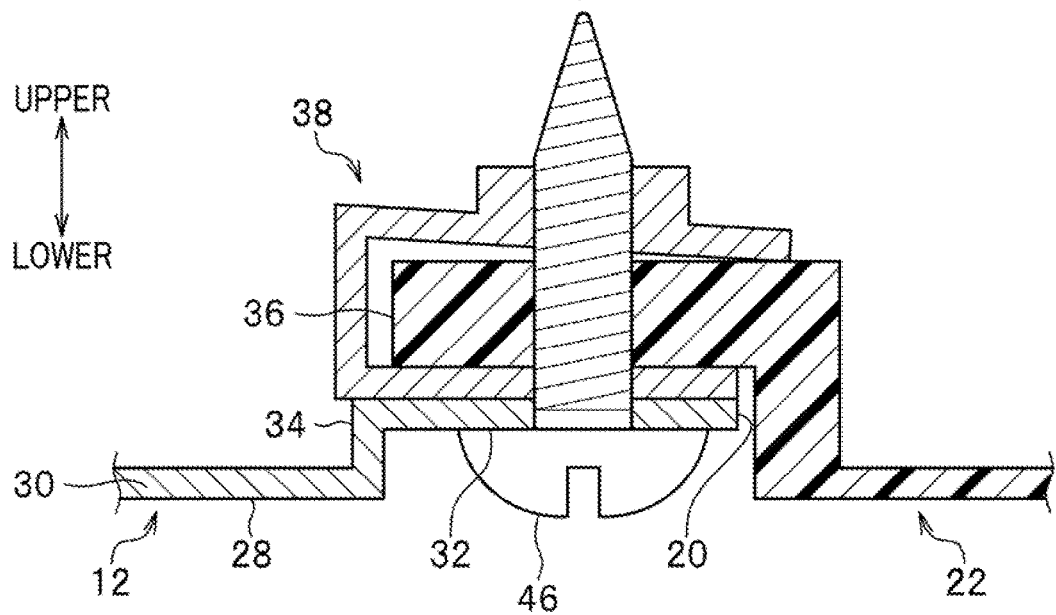
FIG. 11 is a schematic sectional view illustrating the cover member attached to the undercover to close the opening.

As seen in FIG. 11, when the cover member 22 is attached to the undercover 12 to close the opening 20, the second fixing portions 36 of the cover member 22 are located over upper surfaces (upper sides) of the cover member 22. In other words, each second fixing portion 36 is located right above the corresponding first fixing portion 32 of the undercover 12 through a clip member 38 to be described later. To be more specific, when the cover member 22 is attached to the undercover 12 using screw members 46 to be described later, the second fixing portions 36 of the cover member 22 are positioned inward (upward) of the first fixing portions 32 of the undercover 12.

Figure 4:
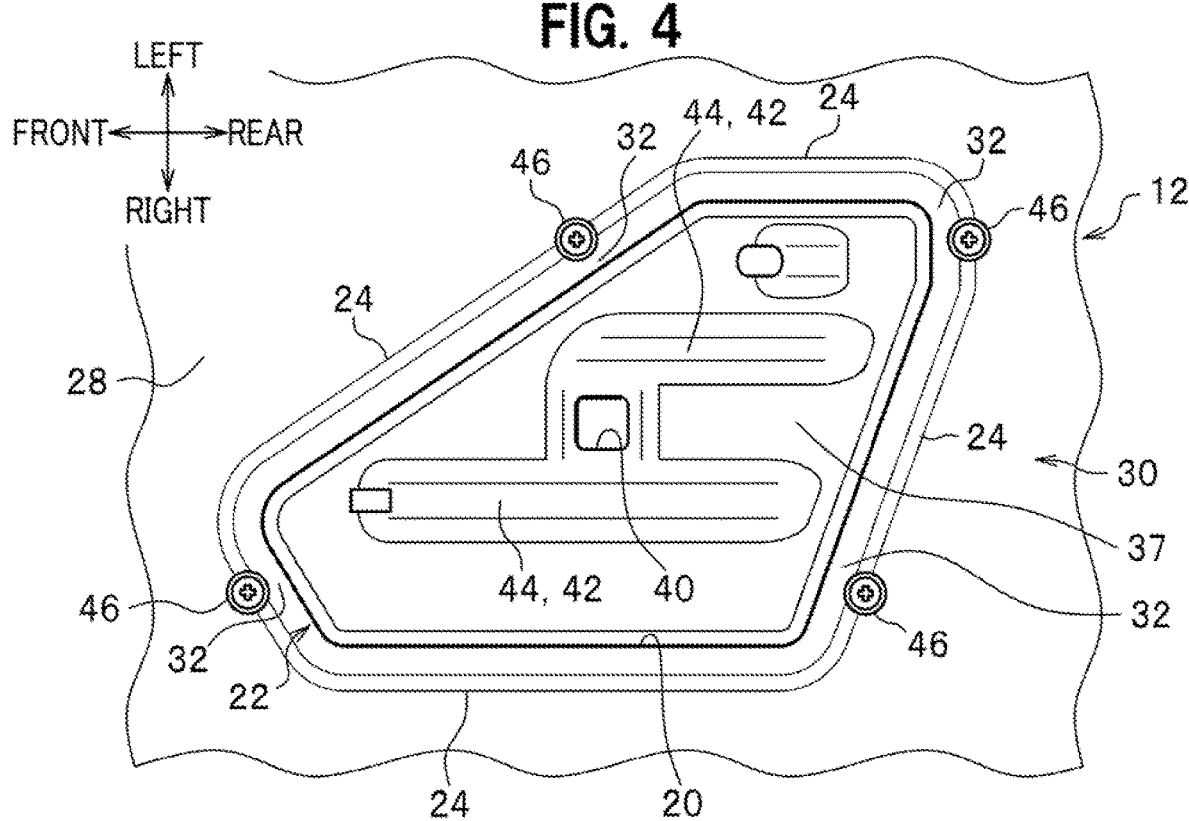
FIG. 4 is an enlarged bottom view of the rear part of the vehicle body, in which a cover member has been attached to the undercover to close an opening of the undercover.

As seen in FIGS. 4, 6A and 6B, the cover body 37 has a through-hole 40 at a generally central portion thereof; the through-hole 40 is generally rectangular in shape as viewed from below, and pierces through upper and lower surfaces of the cover member 22. The through-hole 40 is formed such that an operator can see an inner structure of the vehicle 10 through the through-hole 40 from the lower side of the undercover 20 (see FIG. 12E) and that the operator can hold the cover member 22 by inserting his/her finger(s) into the through-hole 40 (see FIGS. 12A to 12D to be described later).

Further, the cover body 37 has a pair of beads (first beads) 42, 42; as seen in FIG. 6A, the beads 42, 42 extend substantially parallel to each other along the longitudinal direction of the vehicle 10 and protrude upward. The through-hole 40 is disposed between the beads 42, 42. The beads 42, 42 extend in a direction substantially parallel to an insertion direction S (sliding direction) in which the cover member 22 is to be inserted into and attached to the undercover 12.

When viewing the cover member 22 having been attached to the undercover 12 from the bottom side (from below), each of the beads 42, 42 curves inward to form a recess portion 44 (see FIG. 6B). With this configuration, when the operator attempts to attach the cover member 22 to the undercover 12 to close the opening 20, while inserting his/her finger(s) into the through-hole 40, the operator can hold the cover member 22 with his/her fingers placed along the recess portions 44 of the beads 42. This enables the operator to hold the cover member 22 with ease. The cover member 22 becomes gradually narrower in width that is a breadth in a direction substantially orthogonal to the insertion direction S (sliding direction), with distance farther in the insertion direction S; accordingly, as viewed from a side that is substantially orthogonal to the insertion direction S, the cover member has a generally acute-shaped portion.

A fixing member consists of a screw member 46 (see FIG. 10) such as a tapping screw and other well-known screws, and a clip member 38 (see FIG. 7) such as a clip nut and other well-known clips. The clip member 38 is formed by bending a board-like member into a substantially U-shaped configuration. The clip member 38 has springiness, and a pair of holes 48, into which a screw member 46 is driven, are formed in the clip member 38.

Figure 7:
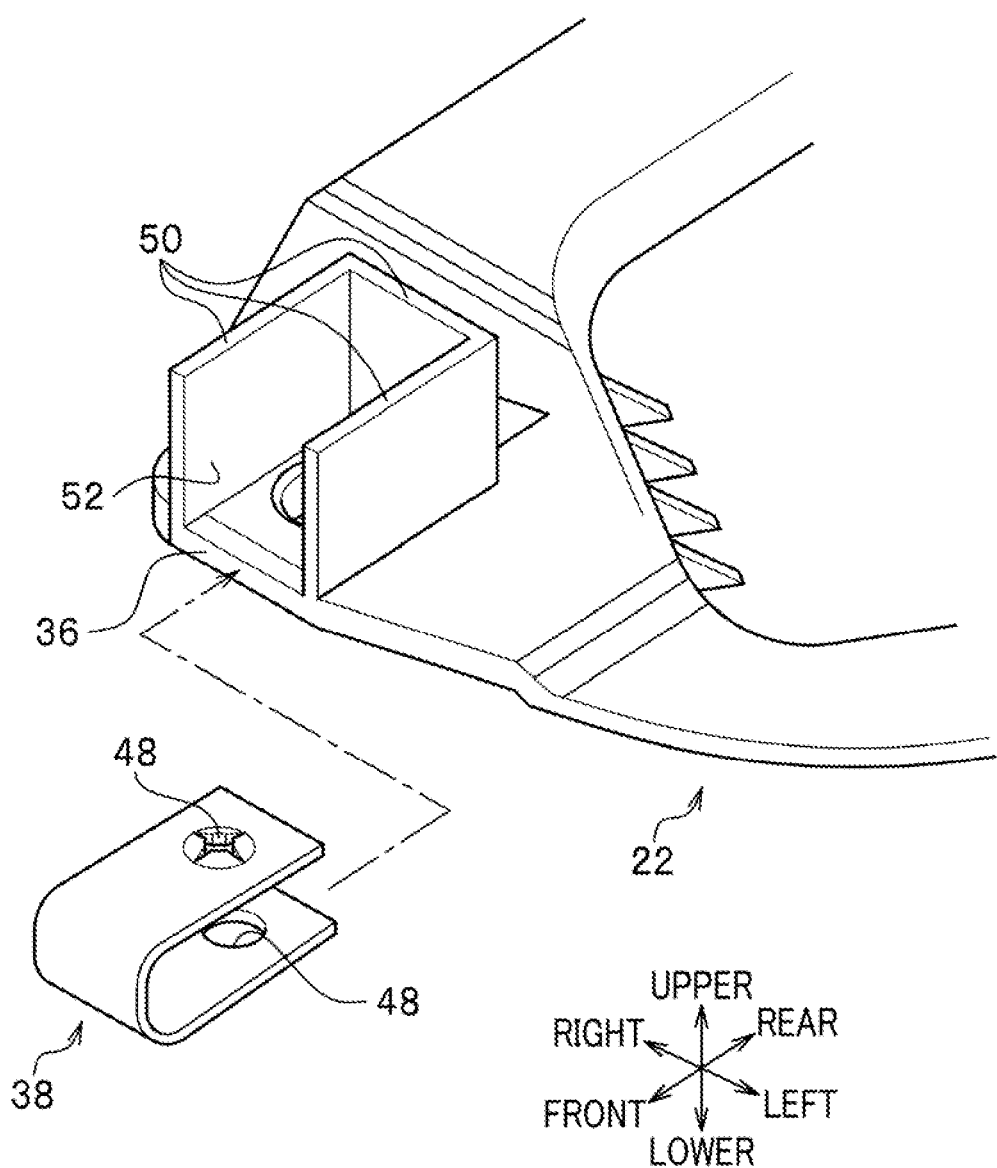
FIG. 7 is an enlarged perspective view illustrating the relation between the cover member and a clip member.
Figure 8:
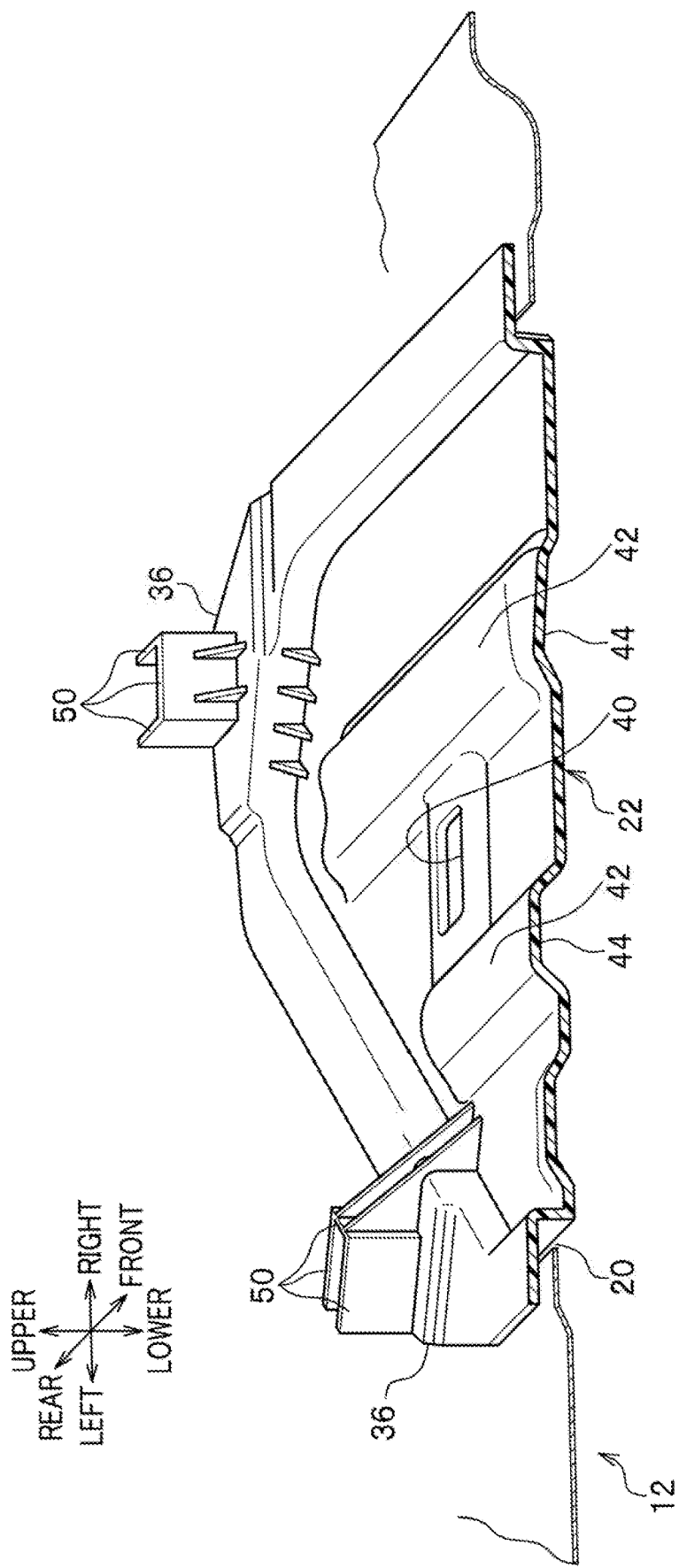
FIG. 8 is a perspective sectional view taken on the line VIII-VIII of FIG. 2.
Figure 10:
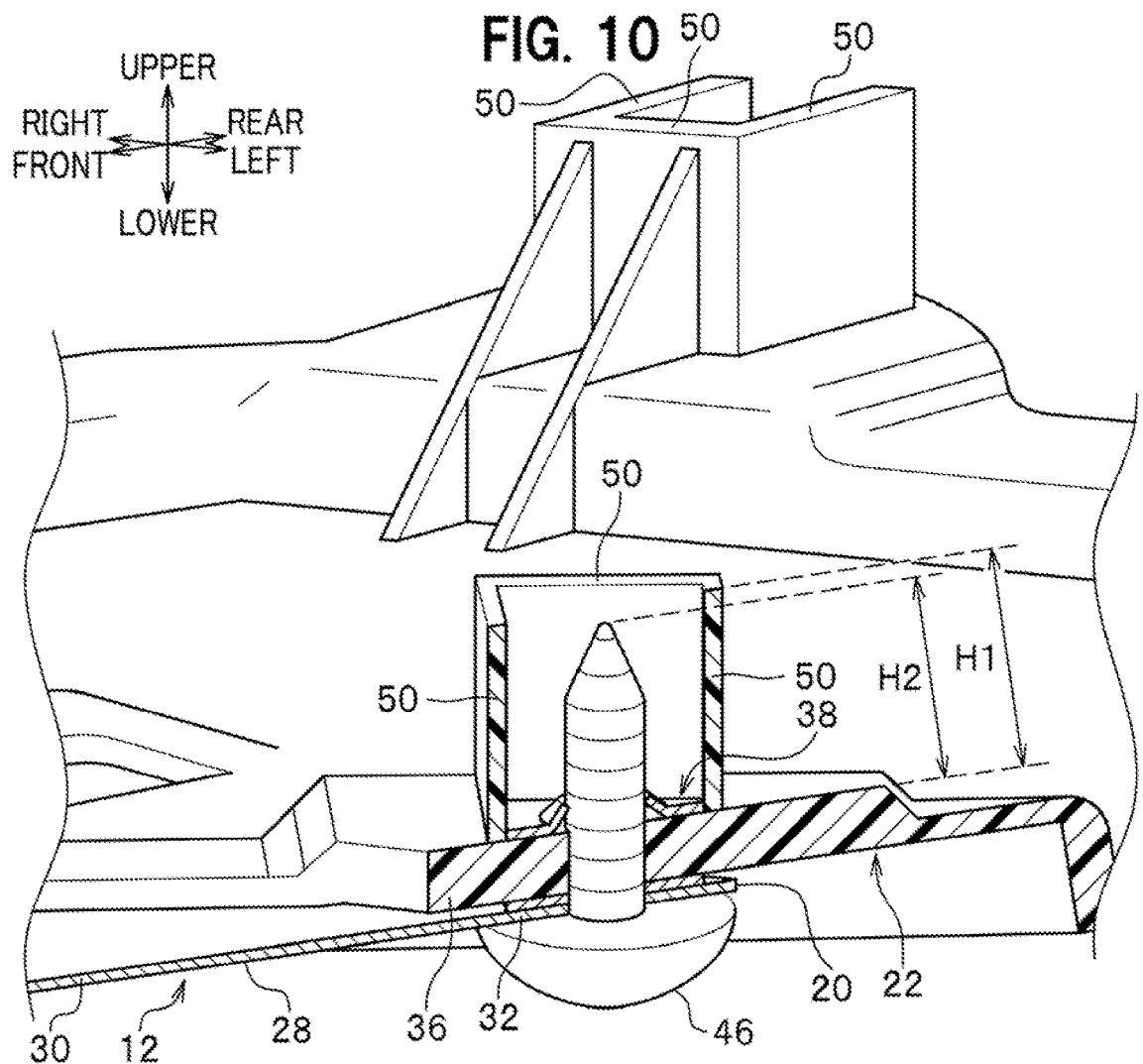
FIG. 10 is an enlarged perspective view, partly in section, illustrating the relation between the height of wall portions of the cover member and the height of a screw member.

As seen in FIGS. 7 and 10, each of the second fixing portions 36 includes a plurality of (three) wall portions 50 disposed around a corresponding screw member 46; the screw member 46 is surrounded on three sides by the wall portions 50. The plurality of wall portions 50 are arranged in a substantially U-shape as viewed from above, with each of the wall portions 50 intersecting at right angles with another wall portion 50. Plural sets of wall portions 50 are arranged along the peripheral edge of the cover member 22, and each set of wall portions 50 is formed such that no wall portion is provided on a side extending along and facing to the peripheral edge of the cover member 22. As seen in FIG. 7, the two oppositely arranged wall portions 50 form an open side 52. A clip member 38 can be attached to the second fixing portion 36 with ease from this open side 52, and the clip member 38 can hold the second fixing portion 36 between one end portion and the other end portion that are formed by bending (see FIG. 11).

As seen in FIG. 10, the height H1 of each of the wall portions 50 in the vertical direction is higher than the maximum height H2 of the screw member 46 protruding upward from the second fixing portion 36 (i.e., H1>H2). The each of the wall portions 50 has the same height.

The vehicle 10, to which the vehicle body lower structure according to this exemplified embodiment has been applied, is basically configured as described above. The operational advantages of the vehicle body lower structure will be described below.

First, the manner of attachment of the cover member 22 to the undercover 12 will be described. It is noted that clip members 38 are attached in advance to the second fixing portions 36 of the cover member 22.

Figure 12A:
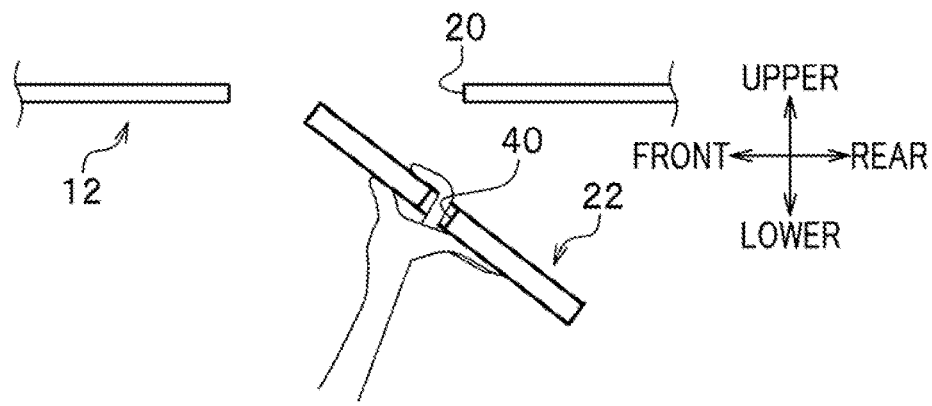
FIGS. 12A to 12D are explanatory views illustrating operation procedures for attaching the cover member to the undercover to close the opening.
Figure 12B:
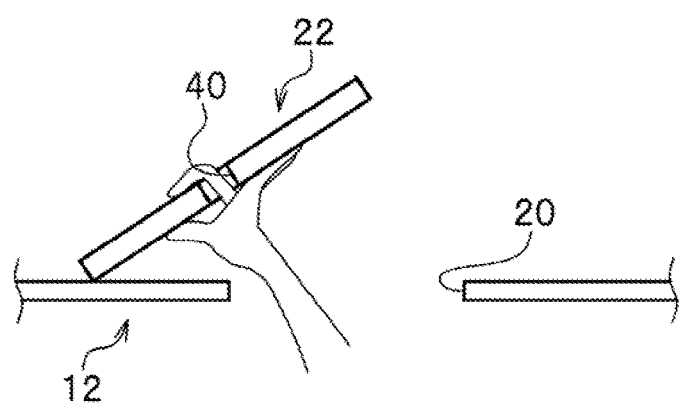
Figure 12C:
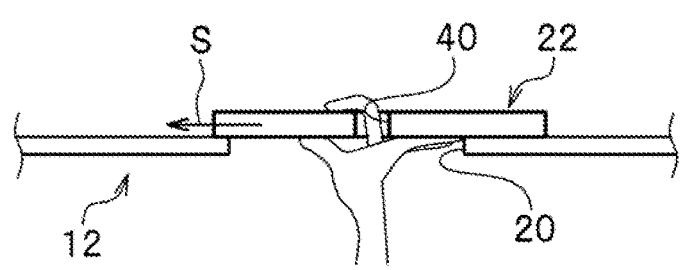
Figure 12D:
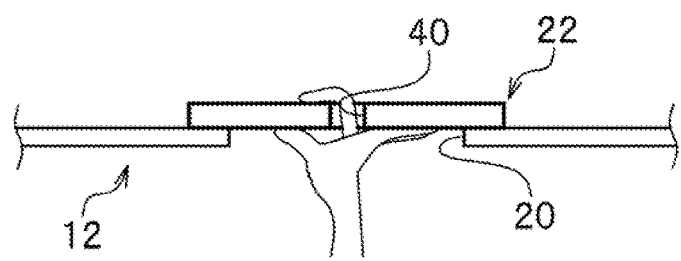
Figure 12E:
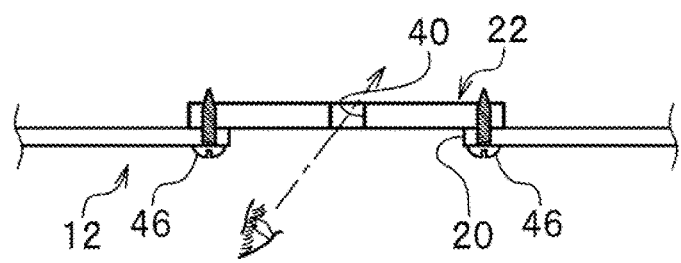
FIG. 12E is an explanatory view illustrating a state in which an operator can see an inner structure of the vehicle through a through-hole of the undercover.

An operator inserts his/her finger(s) into the through-hole 40 of the cover member 22, and hold the cover member 22 with his/her fingers placed along the recess portions 44 of the beads 42. As seen in FIG. 12A, the operator inserts the cover member 22 into a space above the undercover 12 from the lower side of the undercover 12 through the through-opening 20, while holding the cover member 22. The operator then slides the cover member 22 in a direction in which the generally acute-shaped portion of the cover member 22 points (i.e., direction in which the width of the cover member 22 becomes gradually narrower), that is the insertion direction S, while retaining the cover member 22 above the undercover 12. Accordingly, the second fixing portions 36 of the cover member 22 are positioned relative to the first fixing portions 32 of the undercover 12 (see FIGS. 12B to 12D).

After the first fixing portions 32 of the undercover 12 and the second fixing portions 36 of the cover member 22 are positioned to each other, a screw member 46 is driven into a corresponding hole formed in the respective first fixing portions 32 of the undercover 12, the clip member 38, and a corresponding second fixing portion 36 of the cover member 22, so that the cover member 22 is securely fixed to the undercover 12 to close the opening 20 (see FIG. 11).

As seen in FIG. 11, when the cover member 22 is securely fixed to the undercover 12 to close the opening 20, the first fixing portion 32 of the undercover 12 is located lowermost (i.e., at an outer side), the other end portion of the clip member 38 is superposed on the upper surface of the first fixing portion 32, and the second fixing portions 36 of the cover member 22 is superposed on the upper surface of the other end portion of the clip member 38, and further the one end portion of the clip member 38 is superposed on the upper surface of the second fixing portion 36.

In contrast, according to the conventional vehicle body lower structure, the undercover including first fixing portions is formed by injection molding, and the cover member including second fixing portions is also formed by injection molding. Each of the first fixing portions of the undercover is located over the corresponding second fixing portion of the cover member through a clip member. To be more specific, when the cover member is attached to the undercover, the second fixing portion of the cover member is located lowermost (i.e., at an outer side), the other end portion of the clip member is superposed on the upper surface of the second fixing portion, and the first fixing portion of the undercover is superposed on the upper surface of the other end portion of the clip member, and further the one end portion of the clip member is superposed on the upper surface of the first fixing portion, and then the screw member is driven into the corresponding holes respectively formed in the second fixing portion, the clip member, and the first fixing portion.

In the above exemplified embodiment according to the present invention, the undercover 12 includes the general portion 28 and the first fixing portions 32, and at least the general portion 28 and the first fixing portions 32 are formed by stamping a board member having a constant thickness (i.e., sheet metal or metal plate). Further, the second fixing portions 36 of the cover member 22 are formed by injection molding such that the thickness of the second fixing portions 36 is thicker than the thickness of the board member. To be more specific, while the thickness of the undercover 12 is reduced at the general portion 28 and at the first fixing portions 32 as compared with those of the undercover according to the conventional vehicle body lower structure, the thickness of the cover member 22 is increased at the second fixing portions 36. Further, the clip member 46 holds the upper surface and the lower surface of the second fixing portion 36 of the cover member 22, instead of holding the upper surface and the lower surface of the first fixing portion of the undercover according to the conventional vehicle body lower structure. Further, when the cover member 22 is attached to the undercover 12 to close the opening 20, the second fixing portions 36 of the cover member 22 are located over (right above) the upper surfaces of the first fixing portions 32 of the undercover 12.

With this configuration of the exemplified embodiment, the first fixing portions 32 of the undercover 12 support the second fixing portions 36 of the cover member 22 by their surfaces, and further the clip members 38 and the screw members 46 are held at the second fixing portions 36 having an increased thickness. Accordingly, even if snow or rainwater flows into a space above the undercover 12, it is possible to reliably prevent the cover member 22 from falling off.

In the above exemplified embodiment, the undercover 12 is formed by stamping, so that a large-sized undercover 12 can be manufactured with ease. This leads to improved productivity and cost reduction as well as to reducing the weight of the vehicle.

Further, in the above exemplified embodiment, the through-hole 40 of the cover member 22 is formed such that an operator can see an inner structure of the vehicle 10 through the through-hole 40 and that the operator can hold the cover member 22 by inserting his/her finger(s) into the through-hole 40. With this configuration of the exemplified embodiment, when the operator inserts the cover member 22 into the space above the undercover 12 through the opening 20 of the undercover 12, the mountability and the workability for attaching the cover member 22 can be improved by the operator inserting his/her finger(s) into the through-hole 40 of the cover member 22. Further, to inspect a completed vehicle or for other reasons, the operator can see the inner structure of the vehicle 10 through the through-hole 40 of the undercover 12; for example, the operator can easily check whether leakage of oil occurs at the joint portion of the drive shaft, without removing the cover member 22.

Further, in the above exemplified embodiment, the cover member 22 has upwardly protruding beads 42. These beads 42 extend substantially parallel to the insertion direction S (sliding direction) in which the cover member 22 is to be inserted and attached to the undercover 12. With this configuration of the exemplified embodiment, when the operator attempts to attach the cover member 22 to the undercover 12 to close the opening 20, the operator can place his/her fingers along the recess portions 44 of the beads 42. This can greatly improve the holdability of the cover member 22 by the operator, and at the same time, the operator can easily rotate the cover member 22 around the through-hole 40, in which the operator's finger(s) are inserted.

Further, in the above exemplified embodiment, the cover member 22 has a generally acute-shaped portion, in which the width thereof (i.e., breadth in a direction substantially orthogonal to the insertion direction S) becomes gradually narrower with distance farther in the insertion direction S. With this configuration of the exemplified embodiment, since the cover member 22 has a generally acute-shaped portion that gradually narrows toward the tip end in the insertion direction S, the operator can insert the cover member 22 with ease into the space above the undercover 12 through the through-opening 20. The space above the undercover 12 is narrow with less extra space left therein; however, thanks to the generally acute-shaped portion provided at the tip end portion of the cover member 22, the operator can move the cover member 22 easily and smoothly in the narrow space.

Further, in the above exemplified embodiment, each of the second fixing portions 36 includes a plurality of wall portions 50 disposed around a corresponding screw member 46 such that the screw member 46 is surrounded on three sides by the wall portions 50. The height of each of the wall portions 50 in the vertical direction is higher than the maximum height of the screw member 46 protruding upward from the second fixing portion 36. For example, if a wheel of the vehicle 10 hits a curb or a bump and rides thereon, the undercover 12 may displace upward. However, with the configuration of the exemplified embodiment, it is possible to prevent the tip end of the screw member 46 from contacting other components (e.g., transmission) disposed in the space above the undercover 12.

Further, in the above exemplified embodiment, a bead 24 is provided on the undercover 12 at a position surrounding the opening 20. With this configuration of the exemplified embodiment, since the bead 24 can enhance the stiffness and the strength of the undercover 12 around the opening 20, the enhanced stiffness and strength of the undercover 12 can prevent the cover member 22 from falling off due to the weight of snow or rainwater. Further, provision of the bead 24 can suppress sinking of the undercover 12 under its own weight, thereby preventing the undercover 12 from hitting a curb and falling off.

Further, in the above exemplified embodiment, a pair of right and left braces 26, 26 (sub-frame constituent members) are arranged in the vehicle width direction beside the opening 20 of the undercover 12; these braces 26, 26 extend in the longitudinal direction of the vehicle 10 and are bridged between the front cross member 16 and the rear cross member 18. With this configuration of the exemplified embodiment, since the pair of right and left braces 26, 26 extending in the longitudinal direction of the vehicle 10, that is a direction substantially parallel to the insertion direction S (sliding direction), serve as a guide member, the operator can smoothly insert the cover member 22 into the space above the undercover 12 through the opening 20.

The invention claimed is:

1. A vehicle body lower structure comprising:
    an undercover having an opening and a first fixing portion disposed around the opening;
    a cover member having a second fixing portion, the cover member being detachably attached to the undercover to close the opening; and
    a fixing member configured to detachably attach the second fixing portion to the first fixing portion, the fixing member being fixed to the first fixing portion and the second fixing portion from a lower side of the undercover,
    wherein the undercover includes a general portion and the first fixing portion, and at least the general portion and the first fixing portion are made of a board member having a constant thickness,
    wherein the second fixing portion of the cover member is thicker than the board member, and
    wherein the second fixing portion of the cover member is located over an upper surface of the undercover.

2. The vehicle body lower structure according to claim 1, wherein the cover member has a through-hole, through which an operator can see an inner structure of a vehicle from the lower side of the undercover and by which the operator can hold the cover member.

3. The vehicle body lower structure according to claim 1, wherein the cover member includes a first bead protruding upward, and
    wherein the first bead extends substantially parallel to an insertion direction in which the cover member is to be inserted into and attached to the undercover.

4. The vehicle body lower structure according to claim 3, wherein the cover member becomes gradually narrower in width that is a breadth in a direction orthogonal to the insertion direction, with distance farther in the insertion direction.

5. The vehicle body lower structure according to claim 1, wherein the fixing member comprises a screw member,
    wherein the second fixing portion comprises a plurality of wall portions disposed around the screw member, the screw member being surrounded on three sides by the wall portions, and
    wherein a height of each of the wall portions in a vertical direction is higher than a height of the screw member protruding upward from the second fixing portion.

6. The vehicle body lower structure according to claim 3, wherein a second bead is provided on the undercover at a position surrounding the opening.

7. The vehicle body lower structure according to claim 1, wherein a sub-frame constituent member extending in a longitudinal direction of a vehicle is disposed beside the opening.

8. The vehicle body lower structure according to claim 1, wherein the undercover is made of the board member, and the board member is a sheet metal or a metal plate,
    wherein the cover member is made of plastic, and
    wherein the second fixing portion of the cover member is disposed at a position corresponding to the first fixing portion of the undercover.

9. The vehicle body lower structure according to claim 8, wherein the undercover is a stamped member, and the cover member is an injection molded member.

10. The vehicle body lower structure according to claim 8, wherein the fixing member comprises a screw member and a clip member, and
    wherein the first fixing portion and the second fixing portion is fixed by the screw member through the clip member.

11. The vehicle body lower structure according to claim 10, wherein the clip member holds an upper surface and a lower surface of the second fixing portion, and
    wherein the screw member pierces through the first fixing portion, the clip member, and the second fixing portion.

12. The vehicle body lower structure according to claim 1, wherein a bead is provided on the undercover at a position surrounding the opening.

* * * * *